US012603866B2

(12) United States Patent
Li et al.

(10) Patent No.: US 12,603,866 B2
(45) Date of Patent: Apr. 14, 2026

(54) SECURITY ARCHITECTURE AND SYSTEM FOR CENTRAL GATEWAY, AND STORAGE MEDIUM

(71) Applicant: BEIJING NATIONAL NEW ENERGY VEHICLE TECHNOLOGY INNOVATION CENTER CO., LTD., Beijing (CN)

(72) Inventors: Qiuxia Li, Beijing (CN); Chengyin Yuan, Beijing (CN)

(73) Assignee: BEIJING NATIONAL NEW ENERGY VEHICLE TECHNOLOGY INNOVATION CO. LTD, Beijing (CN)

( * ) Notice: Subject to any disclaimer, the term of this patent is extended or adjusted under 35 U.S.C. 154(b) by 66 days.

(21) Appl. No.: 18/706,110

(22) PCT Filed: Aug. 11, 2022

(86) PCT No.: PCT/CN2022/111844
§ 371 (c)(1),
(2) Date: Apr. 30, 2024

(87) PCT Pub. No.: WO2023/124100
PCT Pub. Date: Jul. 6, 2023

(65) Prior Publication Data
US 2024/0422132 A1      Dec. 19, 2024

(30) Foreign Application Priority Data

Dec. 29, 2021      (CN) ......................... 202111638901.X

(51) Int. Cl.
*H04L 9/40* (2022.01)
(52) U.S. Cl.
CPC ........ *H04L 63/029* (2013.01); *H04L 63/0428* (2013.01); *H04L 63/08* (2013.01)

(58) Field of Classification Search
CPC .... H04L 63/029; H04L 63/0428; H04L 63/08
See application file for complete search history.

(56) References Cited

U.S. PATENT DOCUMENTS

| | | | | | |
|---|---|---|---|---|---|
| 2014/0337976 | A1* | 11/2014 | Moeller | .............. | H04W 12/128 726/23 |
| 2020/0274851 | A1* | 8/2020 | Qiao | ................... | H04L 63/0263 |
| 2023/0019817 | A1* | 1/2023 | Huang | .................... | H04L 67/12 |

FOREIGN PATENT DOCUMENTS

| | | |
|---|---|---|
| CN | 108521410 A | 9/2018 |
| CN | 109714344 A | 5/2019 |

(Continued)

OTHER PUBLICATIONS

Dibaei et al., Attacks and Defences on Intelligent Connected Vehicles: a survey, (2020), Digital Communications and Networks. ( Year: 2020).*

Contreras-Castillo et al., A seven-layered model architecture for Internet of Vehicles, (2017), Journal of Information and Telecommunication, 1(1), 4-22. https://doi.org/10.1080/24751839.2017. 1295601 (Year: 2017).*

(Continued)

*Primary Examiner* — Chau Le

(74) *Attorney, Agent, or Firm* — FisherBroyles, LLP; Roger L. Browdy; Ronni S. Jillions

(57) ABSTRACT

The present disclosure relates to the technical field of intelligent gateway security, in particular to a security architecture and system for a central gateway, and a storage medium. The security architecture includes an application security layer, a data security layer, a network security layer, a node security layer, an identity and authentication management layer, and a security operation and maintenance layer; wherein the application security layer is used to ensure the security of application software; the data security layer is used to ensure the security of data passing through a central gateway; the security of in-vehicle and out-vehicle network communication of the central gateway is ensured by the network security layer; the node security layer is a support carrier for the application security layer, the data (Continued)

security layer, and the network security layer; and the identity and authentication management layer and the security operation and maintenance layer are both applied to the application security layer, the data security layer, the network security layer, and the node security layer. The central gateway is not only a simple data exchange center, but also has data and computing power, and provides common functions of a sharing service, central management, central control, and the like for a complete vehicle; and the central gateway in the present disclosure has double-layer protection of local data security and data transmission security.

16 Claims, 1 Drawing Sheet

(56)                    References Cited

FOREIGN PATENT DOCUMENTS

| | | |
|---|---|---|
| CN | 113242251 A | 8/2021 |
| CN | 114301739 A | 4/2022 |

OTHER PUBLICATIONS

Zeinab El-Rewini et al., Cybersecurity challenges in vehicular communications, (2020), Vehicular Communications, vol. 23. (Year: 2020).*

Zhang et al., A Cyber Security Evaluation Framework for In-Vehicle Electrical Control Units, (Nov. 2021)IEEE Open Access Journal, Digital Object Identifier 10.1109/ACCESS.2021.3124565 (Year: 2021).*

* cited by examiner

| Security application | Access control | Application encryption | Intrusion detection | Security diagnosis | Identity and authentication management | Security operation and maintenance |
| | Application security audit | Software hardening and patching | Security configuration management | WEB application firewall | | |
| Data security | Data isolation | Data tampering prevention | Data backup | | Centralized certificate management and key management | Operation and maintenance monitoring |
| | Data encryption | Privacy protection | Data access control | Data leakage prevention | | |
| Network security | Transmission encryption | Traffic audit | SecOC | Message detection | | Emergency response |
| | Firewall | IPS/IDS | DDos protection | VPN | | |
| Module security | Secure/reliable remote upgrade | Lightweight trusted computing | External port protection | Hardware encryption | | Security log |
| | Secure boot | Side channel attack protection | Software hardening and security configuration | Secure storage | | |

SECURITY ARCHITECTURE AND SYSTEM FOR CENTRAL GATEWAY, AND STORAGE MEDIUM

TECHNICAL FIELD

The present disclosure relates to the technical field of intelligent gateway security, in particular to a security architecture and system for a central gateway, and a storage medium.

BACKGROUND

With the rapid development of intelligentization and networking of vehicles, the comprehensive network connections between the vehicles, between the vehicles and people, between the vehicles and roads, between the vehicles and service platforms have been implemented, but the consequent vehicle information security issues caused by network attacks on connected vehicles by means of information tampering, virus intrusion, malicious code implantation, and the like are becoming increasingly severe. How to ensure the safety of intelligent vehicles and solve the contradiction between convenience and safety has become an important factor related to whether the healthy and sustainable development of vehicle networking can be implemented, and strengthening vehicle information security protection has become a top priority.

The central gateway is a core component of an electronic and electrical architecture for a next-generation intelligent vehicle, integrates a conventional controller area network/local interconnect network (CAN/LIN) gateway and TBOX, and is added with devices and functions of Ethernet gateway, over-the-air (OTA), central control, vehicular edge computing, and the like. However, the central gateway as a communication hub for in-vehicle and out-vehicle networks in the era of intelligent vehicles not only needs to control the access of external interfaces to the in-vehicle network to implement networking service functions of remote upgrade, online diagnosis, predictive maintenance, on-site monitoring, verification and calibration, and the like, but also needs to securely and reliably interconnect and process data in a heterogeneous in-vehicle network inside the vehicle to implement functional domain isolation between systems, so comprehensive security solutions and advanced security protection need to be provided to ensure secure in-vehicle and out-vehicle communication.

SUMMARY

In order to solve the problem that an information security protection system for a central gateway in the prior art is not comprehensive enough, the present disclosure provides a security architecture and system for a central gateway, and a storage medium.

The technical content of the present disclosure is as follows:

A security architecture for a central gateway includes an application security layer, a data security layer, a network security layer, a node security layer, an identity and authentication management layer, and a security operation and maintenance layer;

wherein the application security layer is used to ensure the security of application software; after the security of the application software is determined, the data security layer is used to ensure the security of data passing through a central gateway; after it is confirmed that the data is secure, the security of in-vehicle and out-vehicle network communication of the central gateway is ensured by the network security layer; the node security layer is a support carrier for the application security layer, the data security layer, and the network security layer; and the identity and authentication management layer and the security operation and maintenance layer are both applied to the application security layer, the data security layer, the network security layer, and the node security layer.

Further, the application security layer includes:

an access control module configured to manage application and access permissions of the application software;

an application encryption module configured to encrypt the application software;

an intrusion detection module configured to detect intrusion data information of the application software;

a security diagnosis module configured to diagnose the security of the application software;

an application security audit module configured to audit the security of the application software;

a software hardening and patching module configured to harden and patch the application software;

a security configuration management module configured to manage a security configuration of the application software; and a WEB application firewall module configured to provide a firewall for a WEB application.

Further, the data security layer includes:

a data isolation module configured to isolate the data;

a data tampering prevention module configured to prevent tampering of the data;

a data backup module configured to back up the data;

a data encryption module configured to encrypt the data and a data transmission process;

a privacy protection module configured to protect privacy of the data;

a data access control module configured to control a permission to access the data;

and a data leakage prevention module configured to prevent leakage of the data.

Further, the network security layer includes:

a transmission encryption module configured to encrypt transmission of the data;

a traffic audit module configured to audit traffic;

a security onboard communication (SecOC) module configured to authenticate in-vehicle sensitive information;

a message detection module configured to detect a network message;

a firewall module configured to provide a firewall for a network;

an intrusion prevention system/intrusion detection system (IPS/IDS) module configured to detect network intrusion and/or prevent intrusion;

a distributed denial of service (DDOS) attack protection module configured to protect a DDOS attack of the network; and a virtual private network (VPN) module configured to establish a private network on the network for encrypted communication.

Further, the node security layer includes:

a remote upgrade module configured to remotely upgrade the software of the central gateway and fix vulnerabilities and patches;

a lightweight trusted computing module configured to establish a lightweight trusted computing platform of the central gateway;

an external port protection module configured to protect the security of an external port of the central gateway;

a hardware encryption module configured to encrypt hardware of the central gateway;

a secure boot module configured to securely boot the central gateway;

a side channel attack protection module configured to protect a side channel attack of the central gateway;

a software hardening and security configuration module configured to harden the software of the central gateway and perform security configuration; and a secure storage module configured to ensure the security of stored data in the central gateway.

Further, the identity and authentication management layer comprises:

a centralized certificate management module and a key management module which ensure the security of the application security layer, the data security layer, the network security layer, and the node security layer.

Further, the security operation and maintenance layer comprises:

an operation and maintenance monitoring module, an emergency response module, and a security log module which ensure the monitoring and security of the application security layer, the data security layer, the network security layer, and the node security layer.

The present disclosure provides a security system for a central gateway of an intelligent vehicle, including:

a memory configured to store an executable instruction; and a processor configured to run the executable instruction stored in the memory to implement the security architecture for a central gateway according to any one of the foregoing.

A computer-readable storage medium stores an executable instruction, where the executable instruction, when executed by a processor, implements the security architecture for a central gateway according to any one of the foregoing.

The present disclosure has at least the following beneficial effects:

(1) The central gateway provided by the present disclosure, as a core key component of the intelligent vehicle, implements physical isolation between the external network and the vehicle, controls security attacks and risk ranges, and avoids extension of the attacks, and its own node security is also a very important link and is an important support and carrier for the application security layer, the data security layer, and the network security layer.

(2) The central gateway is not only a simple data exchange center, but also has data and computing power, and provides common functions of a sharing service, central management, central control, and the like for a complete vehicle; and as a data storage and transmission center of the complete vehicle, the central gateway in the present disclosure has double-layer protection of local data security and data transmission security.

BRIEF DESCRIPTION OF THE DRAWINGS

FIG. 1 is a schematic structural diagram of a security architecture for a central gateway according to the present disclosure.

DETAILED DESCRIPTION OF THE EMBODIMENTS

To make the objectives, technical solutions and advantages of the embodiments of the present disclosure clearer, the technical solutions in the embodiments of the present disclosure will be clearly and completely described below with reference to the accompanying drawings in the embodiments of the present disclosure. Apparently, the described embodiments are some rather than all of the embodiments of the present disclosure. All other embodiments obtained by those of ordinary skill in the art based on the embodiments of the present disclosure without creative efforts should fall within the scope of protection of the present disclosure.

Referring to FIG. 1, the present disclosure provides a security architecture for a central gateway, including an application security layer, a data security layer, a network security layer, a node security layer, an identity and authentication management layer, and a security operation and maintenance layer;

wherein the application security layer is used to ensure the security of application software; after the security of the application software is determined, the data security layer is used to ensure the security of data passing through a central gateway; after it is confirmed that the data is secure, the security of in-vehicle and out-vehicle network communication of the central gateway is ensured by the network security layer; the node security layer is a support carrier for the application security layer, the data security layer, and the network security layer; and the identity and authentication management layer and the security operation and maintenance layer are both applied to the application security layer, the data security layer, the network security layer, and the node security layer.

Further, the application security layer includes:

an access control module configured to manage application and access permissions of the application software;

an application encryption module configured to encrypt the application software;

an intrusion detection module configured to detect intrusion data information of the application software;

a security diagnosis module configured to diagnose the security of the application software;

an application security audit module configured to audit the security of the application software;

a software hardening and patching module configured to harden and patch the application software;

a security configuration management module configured to manage a security configuration of the application software; and a WEB application firewall module configured to provide a firewall for a WEB application.

Further, the data security layer includes:

a data isolation module configured to isolate the data;

a data tampering prevention module configured to prevent tampering of the data;

a data backup module configured to back up the data;

a data encryption module configured to encrypt the data and a data transmission process;

a privacy protection module configured to protect privacy of the data;

a data access control module configured to control a permission to access the data; and a data leakage prevention module configured to prevent leakage of the data.

Further, the network security layer includes:

a transmission encryption module configured to encrypt transmission of the data;

a traffic audit module configured to audit traffic;

a security onboard communication (SecOC) module configured to authenticate in-vehicle sensitive information;

a message detection module configured to detect a network message;

a firewall module configured to provide a firewall for a network;

an intrusion prevention system/intrusion detection system (IPS/IDS) module configured to detect network intrusion and/or prevent intrusion;

a distributed denial of service (DDOS) attack protection module configured to protect a DDOS attack of the network; and a virtual private network (VPN) module configured to establish a private network on the network for encrypted communication.

Further, the node security layer includes:

a secure/reliable remote upgrade module configured to remotely upgrade the software of the central gateway and fix vulnerabilities and patches;

a lightweight trusted computing module configured to establish a lightweight trusted computing platform of the central gateway;

an external port protection module configured to protect the security of an external port of the central gateway;

a hardware encryption module configured to encrypt hardware of the central gateway;

a secure boot module configured to securely boot the central gateway;

a side channel attack protection module configured to protect a side channel attack of the central gateway;

a software hardening and security configuration module configured to harden the software of the central gateway and perform security configuration; and a secure storage module configured to ensure the security of stored data in the central gateway.

Further, the identity and authentication management layer includes:

a centralized certificate management module and a key management module which ensure the security of the application security layer, the data security layer, the network security layer, and the node security layer.

Further, the security operation and maintenance layer includes:

an operation and maintenance monitoring module, an emergency response module, and a security log module which ensure the monitoring and security of the application security layer, the data security layer, the network security layer, and the node security layer.

The design of central gateway security needs to cover various levels of the architecture, and different levels require different security characteristics. Meanwhile, unified identity authentication and management and a unified security operation and maintenance system at a first level are also needed to ensure the security and reliability of the entire architecture to the maximum extent.

The application security layer is used to ensure the security of the application software, and includes eight protection modules of access control, application encryption, intrusion detection, security diagnosis, application security audit, software hardening and patching, security configuration management, and WEB application firewall, where the access control is a very important function in the information security architecture for a central gateway. Due to the access of heterogeneous terminals, potential threats and risks will be caused to vehicles, and the access control is needed to manage the application and access permissions.

The data security layer is used to ensure the security of the data passing through the central gateway, and includes seven modules of data isolation, data tampering prevention, data backup, data encryption, privacy protection, data access control, and data leakage prevention, where the data encryption includes encryption of the data during transmission.

The network security layer is used to ensure the security of the in-vehicle and out-vehicle network communication of the central gateway, and includes eight modules of transmission encryption, traffic audit, SecOC, message detection, firewall, IPS/IDS, DDOS protection, and VPN.

SecOC refers to security onboard communication, IPS/IDS refers to an intrusion prevention system/intrusion detection system, and DDOS protection refers to a distributed denial of service attack.

The node security layer is used to ensure the security of the hardware of the central gateway, and includes eight modules of secure/reliable remote upgrade, lightweight trusted computing, external port protection, hardware encryption, secure boot, side channel attack protection, software hardening and security configuration, and secure storage, where the secure and reliable remote upgrade can timely complete fixing of the vulnerabilities and patches while completing software update of the central gateway, and avoids system failure after upgrade.

The functions of the identity and authentication management layer and the security operation and maintenance layer cover all functional levels, namely the application security layer, the data security layer, the network security layer, and the node security layer.

The present disclosure provides a security system for a central gateway of an intelligent vehicle, including:

a memory configured to store an executable instruction; and a processor configured to run the executable instruction stored in the memory to implement the security architecture for a central gateway according to any one of the foregoing.

The present disclosure further provides a computer-readable storage medium storing an executable instruction, where the executable instruction, when executed by a processor, implements the security architecture for a central gateway according to any one of the foregoing.

The central gateway plays two important roles in future intelligent vehicles. First, the central gateway is a central hub for in-vehicle and out-vehicle communication, and can seamlessly achieve real-time communication with cloud and roadside devices while requiring secure and reliable interconnection and processing of data in a heterogeneous in-vehicle network inside the vehicle, so comprehensive security solutions and advanced security protection are needed to ensure the security of application layer networking, data transmission, and in-vehicle and out-vehicle network communication, and then application security, data security, and network security in the security protection architecture emerge; meanwhile, the central gateway as a core key component of the intelligent vehicle implements physical isolation between the external network and the vehicle, controls security attacks and risk ranges, and avoids extension of the attacks, so its own node security is also a very important link and is an important support and carrier for the three layers above, namely the application security layer, the data security layer, and the network security layer. Secondly, the central gateway is not only a simple data exchange center, but also has data and computing power, and provides common functions of a sharing service, central management, central control, and the like for a complete vehicle, so the central gateway as a data storage and transmission center of the complete vehicle needs to have double-layer protection of local data security and data transmission security, that is, the security architecture provided by the present disclosure.

The above are only the embodiments of the present disclosure, rather than limiting the scope of patent of the present disclosure. Any equivalent structures or equivalent process transformations made using the content of the description and the accompanying drawings of the present disclosure, directly or indirectly applied in other related technical fields, are similarly included within the scope of patent protection of the present disclosure.

What is claimed is:

1. A security system for a central gateway, comprising an application security layer, a data security layer, a network security layer, a node security layer, an identity and authentication management layer, and a security operation and maintenance layer;

wherein the application security layer is configured to ensure security of application software; after the security of the application software is determined, the data security layer is used to ensure security of data passing through the central gateway; after it is confirmed that the data is secure, security of in-vehicle and out-vehicle network communication of the central gateway is ensured by the network security layer; the node security layer is a support carrier for the application security layer, the data security layer, and the network security layer; and the identity and authentication management layer and the security operation and maintenance layer are both applied to the application security layer, the data security layer, the network security layer, and the node security layer, wherein the application security layer comprises software embodied on a non-transitory computer-readable storage medium for implementing the following steps:

managing, via an access control module, application and access permissions of the application software;

encrypting, via an application encryption module, the application software;

detecting, via an intrusion detection module, intrusion data information of the application software;

diagnosing, via a security diagnosis module, the security of the application software;

auditing, via an application security audit module, the security of the application software;

hardening and patching, via a software hardening and patching module, the application software;

managing, via a security configuration management module, a security configuration of the application software; and providing, via a WEB application firewall module, a firewall for a WEB application.

2. The security system for a central gateway according to claim 1, wherein the data security layer comprises software embodied on the non-transitory computer-readable storage medium for implementing the following steps:

isolating, via a data isolation module, the data;

preventing, via a data tampering prevention module, tampering of the data;

backing up, via a data backup module, the data;

encrypting, via a data encryption module, the data and a data transmission process;

protecting, via a privacy protection module, privacy of the data;

controlling, via a data access control module, a permission to access the data; and preventing, via a data leakage prevention module, leakage of the data.

3. The security system for a central gateway according to claim 1, wherein the network security layer comprises software embodied on the non-transitory computer-readable storage medium for implementing the following steps:

encrypting, via a transmission encryption module, transmission of the data;

auditing, via a traffic audit module, traffic;

authenticating, via a security onboard communication (SecOC) module in-vehicle sensitive information;

detecting, via a message detection module, network message;

providing, via a firewall module, a firewall for a network;

detecting, via an intrusion prevention system/intrusion detection system (IPS/IDS) module, network intrusion and/or prevent intrusion;

protecting, via a distributed denial of service (DDoS) attack protection module, a DDoS attack of the network; and establishing, via a virtual private network (VPN) module, a private network on the network for encrypted communication.

4. The security system for a central gateway according to claim 1, wherein the node security layer comprises software embodied on the non-transitory computer-readable storage medium for implementing the following steps:

remotely upgrading, via a remote upgrade module, the software of the central gateway and fix vulnerabilities and patches;

establishing, via a lightweight trusted computing module, a lightweight trusted computing platform of the central gateway;

protecting, via an external port protection module, security of an external port of the central gateway;

encrypting, via a hardware encryption module, hardware of the central gateway;

securely booting, via a secure boot module, the central gateway;

protecting, via a side channel attack protection module, a side channel attack of the central gateway;

hardening, via a software hardening and security configuration module, the software of the central gateway and performing security configuration; and ensuring, via a secure storage module, security of stored data in the central gateway.

5. The security system for a central gateway according to claim 1, wherein the identity and authentication management layer comprises software embodied on the non-transitory computer-readable storage medium for implementing the following steps:

ensuring, via a centralized certificate management module and a key management module, the security of the application security layer, the data security layer, the network security layer, and the node security layer.

6. The security system for a central gateway according to claim 1, wherein the security operation and maintenance layer comprises software embodied on the non-transitory computer-readable storage medium for implementing the following steps:

ensuring, via an operation and maintenance monitoring module, an emergency response module, and a security log module, monitoring and security of the application security layer, the data security layer, the network security layer, and the node security layer.

7. A security system for a central gateway of an intelligent vehicle, comprising:

a memory configured to store an executable instruction; and a processor configured to run the executable instruction stored in the memory to implement the security architecture for a central gateway according to claim 1.

8. A non-transitory computer-readable storage medium storing an executable instruction, wherein the executable instruction, when executed by a processor, implements the security system for a central gateway according to claim 1.

9. A method for ensuring security of application software running on a central gateway, comprising an application security layer, a data security layer, a network security layer, a node security layer, an identity and authentication management layer, and a security operation and maintenance layer, the method comprising:

after the security of the application software is determined, ensuring, via the data security layer, security of data passing through the central gateway;

after the data security layer confirms that the data is secure, ensuring, via the network security layer, security of in-vehicle and out-vehicle network communication of the central gateway, wherein the node security layer is a support carrier for the application security layer, the data security layer, and the network security layer, and the identity and authentication management layer and the security operation and maintenance layer are both applied to the application security layer, the data security layer, the network security layer, and the node security layer;

managing, via an access control module, application and access permissions of the application software;

encrypting, via an application encryption module, the application software;

detecting, via an intrusion detection module, intrusion data information of the application software;

diagnosing, via a security diagnosis module, the security of the application software;

auditing, via an application security audit module, the security of the application software;

hardening and patching, via a software hardening and patching module, the application software;

managing, via a security configuration management module, a security configuration of the application software; and providing, via a WEB application firewall module, a firewall for a WEB application.

10. The method according to claim 9, further comprising:

isolating, via a data isolation module, the data;

preventing, via a data tampering prevention module, tampering of the data;

backing up, via a data backup module, the data;

encrypting, via a data encryption module, the data and a data transmission process;

protecting, via a privacy protection module, privacy of the data;

controlling, via a data access control module, a permission to access the data; and preventing, via a data leakage prevention module, leakage of the data.

11. The method according to claim 9, further comprising:

encrypting, via a transmission encryption module, transmission of the data;

auditing, via a traffic audit module, traffic;

authenticating, via a security onboard communication (SecOC) module in-vehicle sensitive information;

detecting, via a message detection module, a network message;

providing, via a firewall module, a firewall for a network;

detecting, via an intrusion prevention system/intrusion detection system (IPS/IDS) module, network intrusion and/or prevent intrusion;

protecting, via a distributed denial of service (DDoS) attack protection module, a DDoS attack of the network; and establishing, via a virtual private network (VPN) module, a private network on the network for encrypted communication.

12. The method according to claim 9, further comprising:

remotely upgrading, via a remote upgrade module, the software of the central gateway and fix vulnerabilities and patches;

establishing, via a lightweight trusted computing module, a lightweight trusted computing platform of the central gateway;

protecting, via an external port protection module, security of an external port of the central gateway;

encrypting, via a hardware encryption module, hardware of the central gateway;

securely booting, via a secure boot module, the central gateway;

protecting, via a side channel attack protection module, a side channel attack of the central gateway;

hardening, via a software hardening and security configuration module, the software of the central gateway and performing security configuration; and ensuring, via a secure storage module, security of stored data in the central gateway.

13. The method according to claim 9, further comprising:

ensuring, via a centralized certificate management module and a key management module, the security of the application security layer, the data security layer, the network security layer, and the node security layer.

14. The method according to claim 9, further comprising:

ensuring, via an operation and maintenance monitoring module, an emergency response module, and a security log module, monitoring and security of the application security layer, the data security layer, the network security layer, and the node security layer.

15. A security system for a central gateway of an intelligent vehicle, comprising:

a memory configured to store an executable instruction; and a processor configured to run the executable instruction stored in the memory to implement the security architecture for a central gateway according to claim 9.

16. A non-transitory computer-readable storage medium storing an executable instruction, wherein the executable instruction, when executed by a processor, implements the security system for a central gateway according to claim 9.

* * * * *